(12) United States Patent
Russell et al.

(10) Patent No.: US 11,273,484 B2
(45) Date of Patent: Mar. 15, 2022

(54) RIVET BLOCK INCLUDING INTEGRATED RIVET FEED BORES

(71) Applicant: JR Automation Technologies, LLC, Holland, MI (US)

(72) Inventors: Joseph Robert Russell, Jenison, MI (US); Jason R. Turman, Grand Haven, MI (US); Ryan Nathan Anderson, Dayton, OH (US); Marcos Merino, Grand Rapids, MI (US); Gabriel C. Van't Land, Holland, MI (US)

(73) Assignee: JR Automation Technologies, LLC, Holland, MI (US)

( * ) Notice: Subject to any disclaimer, the term of this patent is extended or adjusted under 35 U.S.C. 154(b) by 0 days.

(21) Appl. No.: 17/170,217

(22) Filed: Feb. 8, 2021

(65) Prior Publication Data

US 2021/0245235 A1 Aug. 12, 2021

Related U.S. Application Data

(60) Provisional application No. 62/971,929, filed on Feb. 8, 2020, provisional application No. 63/031,882, filed on May 29, 2020.

(51) Int. Cl.
*B21J 15/30* (2006.01)
*B21J 15/32* (2006.01)
(Continued)

(52) U.S. Cl.
CPC ............... *B21J 15/30* (2013.01); *B21J 15/02* (2013.01); *B21J 15/32* (2013.01); *B23B 31/11* (2013.01);
(Continued)

(58) Field of Classification Search
CPC ... B21J 15/10; B21J 15/12; B21J 15/30; B21J 15/32; B21J 15/34; B21J 15/36
See application file for complete search history.

(56) References Cited

U.S. PATENT DOCUMENTS 5,375,754 A 12/1994 Botha et al.

FOREIGN PATENT DOCUMENTS

| CN | 110586834 A | * 12/2019 |
|---|---|---|
| SU | 996041 A1 | 2/1983 |
| SU | 1255265 A1 | 9/1986 |

OTHER PUBLICATIONS

Machine Translation of CN 110586834 A (Year: 2019).*

* cited by examiner

*Primary Examiner* — Christopher J Besler
(74) *Attorney, Agent, or Firm* — The Watson IP Group, PLC; Jovan N. Jovanovic

(57) ABSTRACT

A method and rivet apparatus comprise a rivet block, the rivet block comprising a rivet block, a pin bore, and a rivet feed bore. The rivet block is comprised of a top end and a bottom end. The pin bore includes a top end and a bottom end and is disposed within the rivet block. The pin bore extends from the top end to the bottom end of the rivet block and guides a rivet pin that slides downward within the pin bore to push a head of a rivet into a workpiece. The rivet feed bore includes a top end and a bottom end and is disposed within the rivet block. The rivet feed bore extends from the top end to the bottom end of the rivet block, accepts the rivet at the top end of the rivet feed bore, and guides the rivet to the bottom end of the rivet feed bore. The rivet feed bore intersecting the pin bore between the top end and the bottom end of the pin bore at an oblique angle.

14 Claims, 12 Drawing Sheets

(51) Int. Cl.
  *B21J 15/02* (2006.01)
  *B23B 51/00* (2006.01)
  *B23B 51/02* (2006.01)
  *B23B 31/12* (2006.01)
  *B24B 3/26* (2006.01)
  *B23B 31/11* (2006.01)
  *B23B 35/00* (2006.01)
  *B23Q 15/007* (2006.01)
  *B23Q 16/00* (2006.01)

(52) U.S. Cl.
  CPC .......... *B23B 31/1238* (2013.01); *B23B 35/00* (2013.01); *B23B 51/0054* (2013.01); *B23B 51/02* (2013.01); *B23Q 15/0075* (2013.01); *B23Q 16/00* (2013.01); *B24B 3/26* (2013.01); *B23B 2231/58* (2021.01); *B23B 2251/24* (2013.01); *B23B 2251/56* (2013.01)

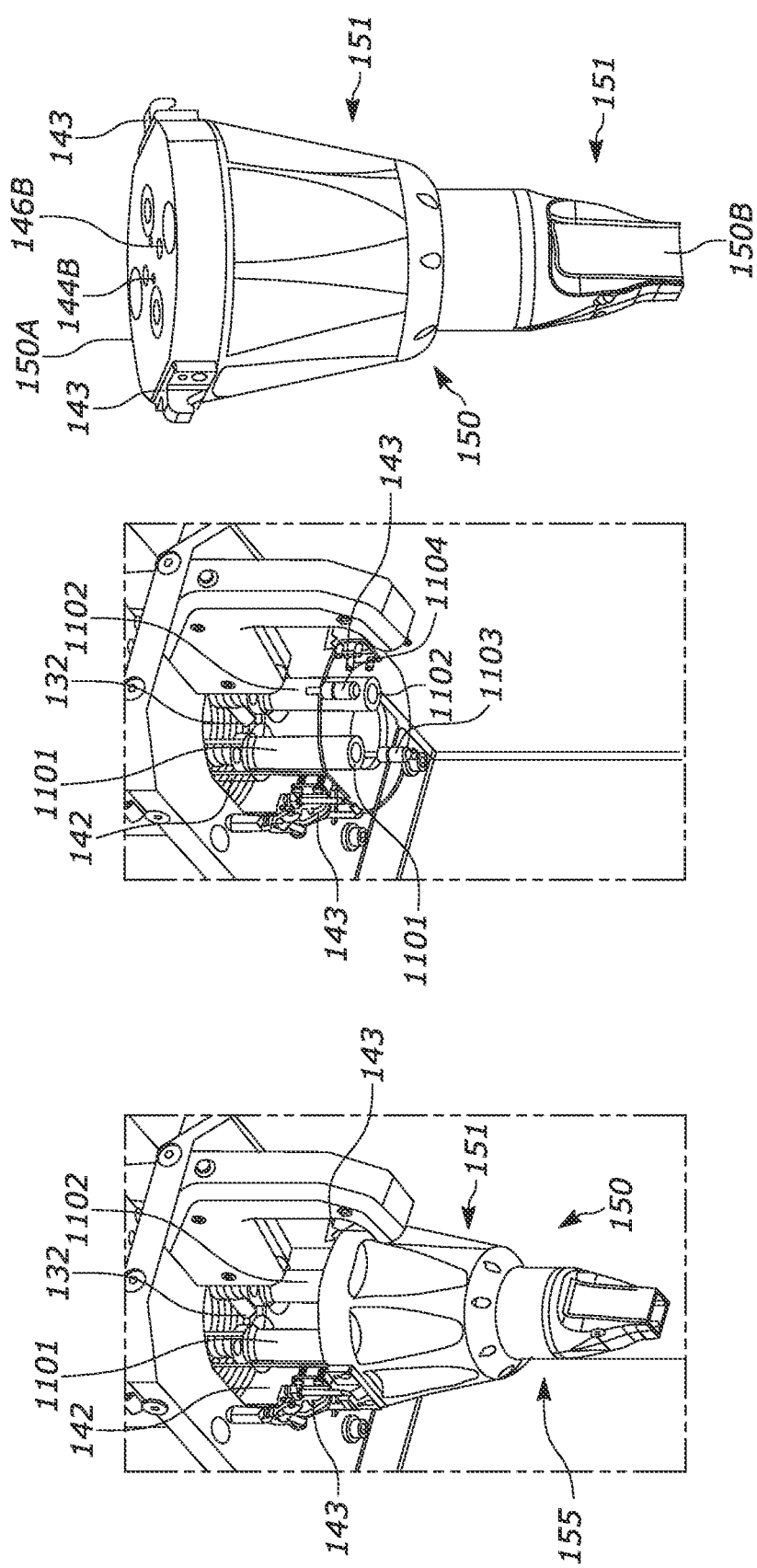

RIVET BLOCK INCLUDING INTEGRATED RIVET FEED BORES

CROSS-REFERENCE TO RELATED APPLICATION

This application claims priority from U.S. Provisional Patent Application Ser. No. 62/971,929 filed on Feb. 8, 2020, entitled "SYSTEM AND METHOD FOR COUPLING FASTENER HARDWARE TO A BRACKET", and claims priority from U.S. Provisional Patent Application Ser. No. 63/031,882 filed on May 29, 2020, entitled "SYSTEM AND METHOD FOR COUPLING FASTENER HARDWARE TO A BRACKET", the entire disclosures of which are hereby incorporated by reference in their entireties.

BACKGROUND OF THE DISCLOSURE

1. Field of the Disclosure

The disclosure relates in general to coupling systems and methods, and more particularly, to a system and a method for coupling fastener hardware to a bracket.

2. Background Art

In many applications it is necessary to join components together through a riveting operation. In one particular field of assembly, fastener hardware (including, but not limited to fastener hardware that is sometimes referred to as a nutplate) are utilized to join components. In such configurations, fastener hardware is riveted to brackets and then structures are attached to the fastener hardware.

The formation of rivet openings in brackets and the riveting of fastener hardware is often a labor-intensive process. Additionally, for many assemblies, multiple quantities of fastener hardware are mounted to a single bracket and the process is repeated many times to make the overall assembly.

Problematically, it is often difficult to quickly and expeditiously form the openings for the rivets and to economically apply the rivets. Additionally, it is often difficult to modify equipment to handle different types of fastener hardware and differently configured brackets.

SUMMARY OF THE DISCLOSURE

The disclosure is directed to a rivet apparatus comprising a rivet block, the rivet block comprising a rivet block, a pin bore, and a rivet feed bore. The rivet block is comprised of a top end and a bottom end. The pin bore includes a top end and a bottom end and is disposed within the rivet block. The pin bore extends from the top end to the bottom end of the rivet block and guides a rivet pin that slides downward within the pin bore to push a head of a rivet into a workpiece. The rivet feed bore includes a top end and a bottom end and is disposed within the rivet block. The rivet feed bore extends from the top end to the bottom end of the rivet block, accepts the rivet at the top end of the rivet feed bore, and guides the rivet to the bottom end of the rivet feed bore. The rivet feed bore intersects the pin bore between the top end and the bottom end of the pin bore at an oblique angle.

In at least one configuration, the rivet is a first rivet, the rivet pin is a first rivet pin, the pin bore is a first pin bore, the rivet feed bore is a first rivet feed bore, and the rivet block further comprises a second pin bore and a second rivet bore. The second pin bore is disposed parallel to the first pin bore and includes a top end and a bottom end and is disposed within the rivet block. The second pin bore extends from the top end to the bottom end of the rivet block, and accepts a second rivet pin that slides downward within the second pin bore to push a head of a second rivet into the workpiece. The second rivet feed bore includes a top end and a bottom end and is disposed within the rivet block. The second rivet feed bore extends from the top end to the bottom end of the rivet block, accepts the second rivet at the top end of the second rivet feed bore, and guides the second rivet to the bottom end of the second rivet feed bore. The second rivet feed bore intersects the second pin bore between the top end and the bottom end of the second pin bore at an oblique angle.

In some configurations, the rivet apparatus further comprises a coupling base. The rivet block is coupled to the coupling base via quick connect couplings to releasably couple the coupling base to rivet block.

In some configurations, the rivet apparatus further comprises a position sensor to provide dynamic information relative to a stack-up thickness of the workpiece.

In some configurations, the rivet apparatus further comprises a coupling base and a biasing member. The biasing member is disposed between the coupling base and the rivet block, and provides a spring force between the coupling base and the rivet block.

In some configurations, the biasing member is at least one of a spring, a pneumatic cylinder, and a gas shock.

In some configurations, the oblique angle is approximately 20 degrees.

In some configurations, the rivet block is moveable toward a fixed end of the rivet pin such that the rivet pin stops flush with the second end of the rivet block.

In some configurations, the rivet apparatus further comprises a rivet retainer disposed at the bottom end of the pin bore. The rivet retainer is biased to retain the rivet, the biasing being overcome by movement of the rivet pin.

In some configurations, a system includes the rivet apparatus, the system further comprises a drill apparatus coupled to the rivet apparatus via a housing.

In some configurations, a distal end of the rivet pin is approximately a same width as a head of the rivet.

In some configurations, the rivet apparatus further comprises a lower riveting portion to deform a tail end of the rivet so as to expand the tail end to be wider than a shaft of the rivet.

In some configurations, the lower riveting portion includes a deforming pin, corresponding to the rivet pin, to deform the tail end of the rivet.

In some configurations, the rivet feed bore extends beyond a first end of the rivet block, the rivet feed bore sliding into and out of a rivet feed tube when the rivet feed block moves upward and downward, respectively.

In some configurations, the rivet block includes an upper portion and a lower portion, with a biasing member disposed between the upper portion and the lower portion.

The disclosure is also directed to a method of riveting a workpiece. The method comprises guiding, by a pin bore, a rivet pin that slides downward within the pin bore to push a head of a rivet into a workpiece, the pin bore including a top end and a bottom end, disposed within a rivet block, and extending from a top end to a bottom end of the rivet block. The method further comprises guiding, by a rivet feed bore, the rivet to a bottom end of the rivet feed bore, the rivet feed bore intersecting the pin bore between the top end and the bottom end of the pin bore at an oblique angle, the rivet feed bore including a top end and a bottom end, disposed within the rivet block, extending from the top end to the bottom end of the rivet block, and accepting the rivet at the top end of the rivet feed bore.

In some configurations of the method, the rivet is a first rivet, the rivet pin is a first rivet pin, the pin bore is a first pin bore, and the rivet feed bore is a first rivet feed bore. The method further comprises guiding, by a second pin bore, a second rivet pin that slides downward within the second pin bore to push a head of a second rivet into the workpiece, the second pin bore including a top end and a bottom end, disposed within the rivet block, and extending from the top end to the bottom end of the rivet block. The method further guiding, by a second rivet feed bore, the second rivet to a bottom end of the second rivet feed bore, the second rivet feed bore intersecting the second pin bore between the top end and the bottom end of the second pin bore at an oblique angle, the second rivet feed bore including a top end and a bottom end, disposed within the rivet block, extending from the top end to the bottom end of the rivet block, and accepting the second rivet at the top end of the second rivet feed bore.

In some configurations of the method, the oblique angle is approximately 20 degrees.

In some configurations of the method, the method further comprises providing, via a position sensor, dynamic information relative to a stack-up thickness of the workpiece.

In some configurations of the method, the rivet block includes an upper portion and a lower portion, the method further comprising biasing, by a biasing member, the upper portion and the lower portion.

BRIEF DESCRIPTION OF THE DRAWINGS

The disclosure will now be described with reference to the drawings wherein:

FIG. 11 illustrates another isometric view of the rivet block and a cut view of the coupling base, in accordance with at least one configuration;

FIG. 12 illustrates another cut view of the coupling base shown in FIG. 11, in accordance with at least one configuration;

FIG. 13 illustrates an isometric view of the rivet block shown in FIG. 1, in accordance with at least one configuration;

DETAILED DESCRIPTION OF THE DISCLOSURE

Figure 1:
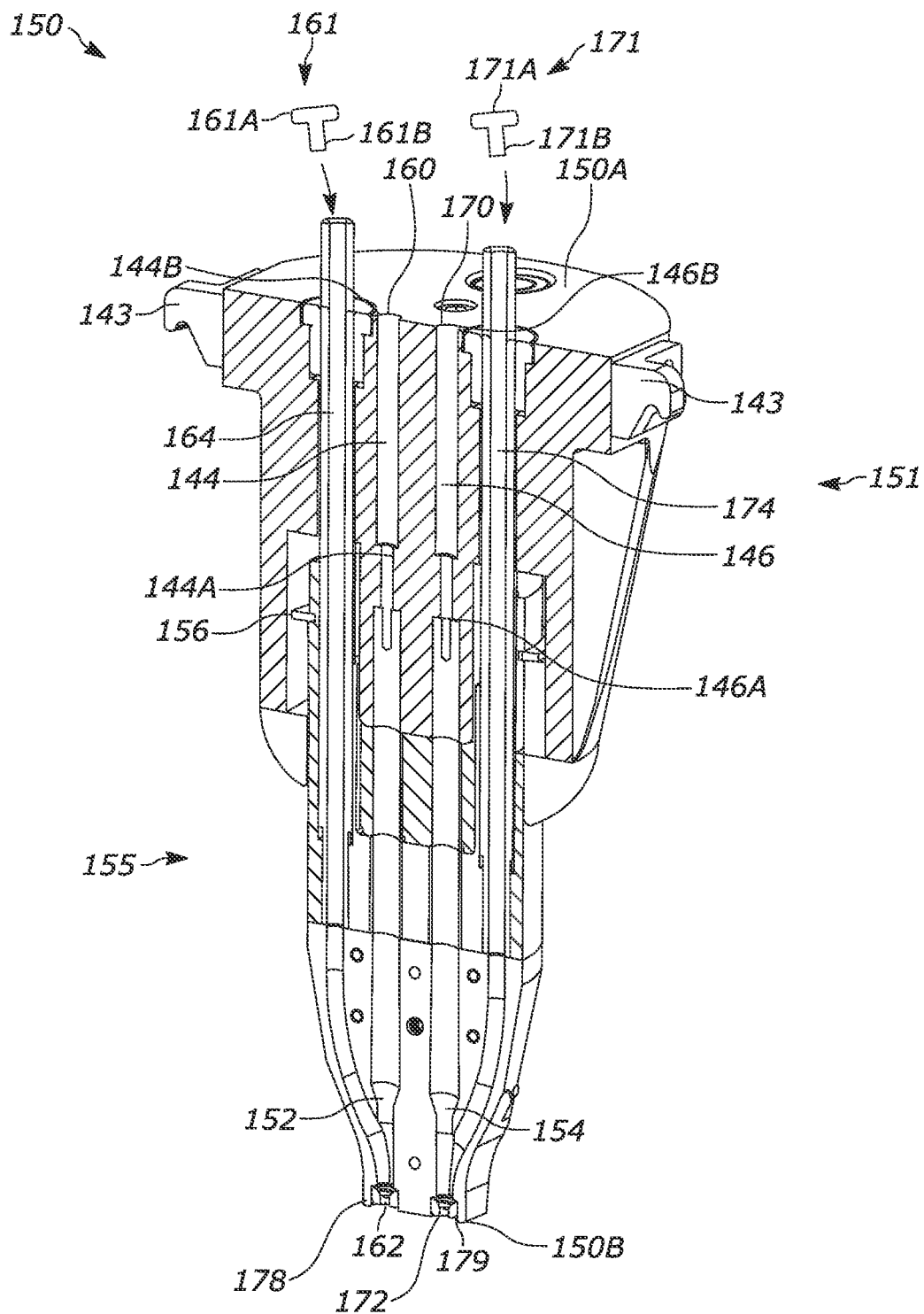
FIG. 1 illustrates an isometric cut view of an example rivet block, in accordance with at least one configuration.

While this disclosure is susceptible of embodiment(s) in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
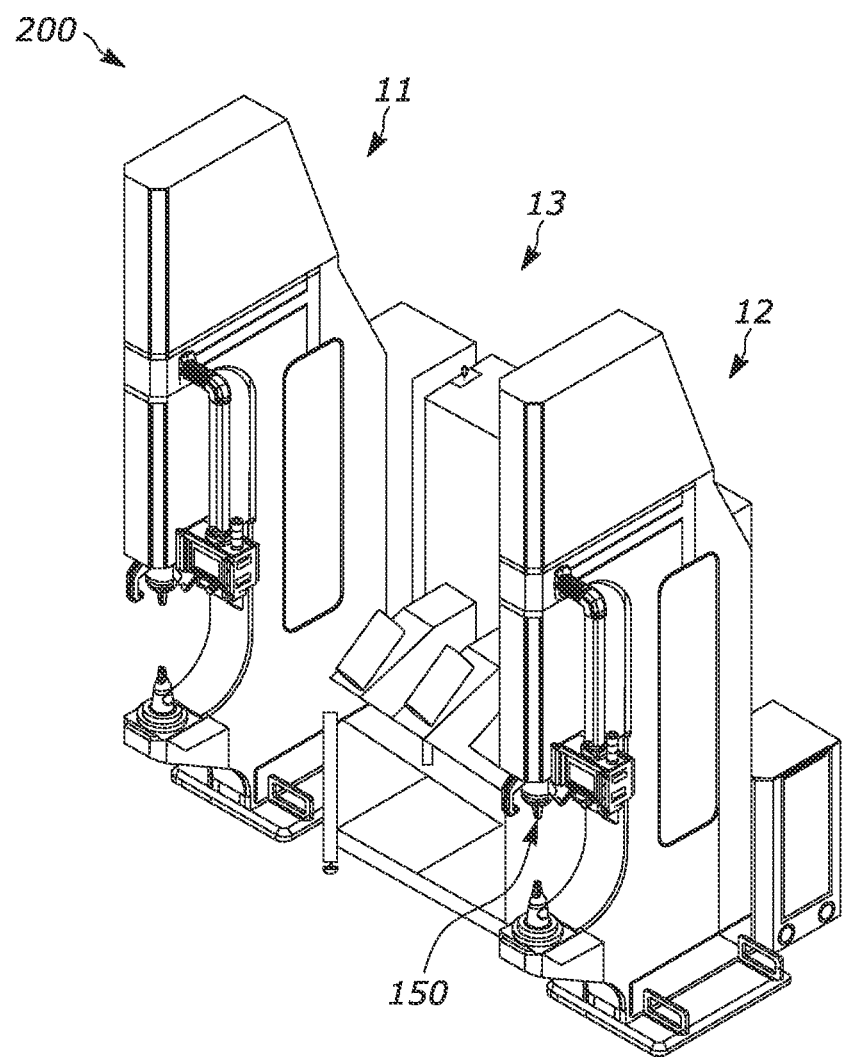
FIG. 2 illustrates an isometric view of an example system including an example rivet apparatus and an example drill apparatus, the rivet apparatus including the rivet block shown in FIG. 1. In accordance with at least one configuration.
Figure 3:
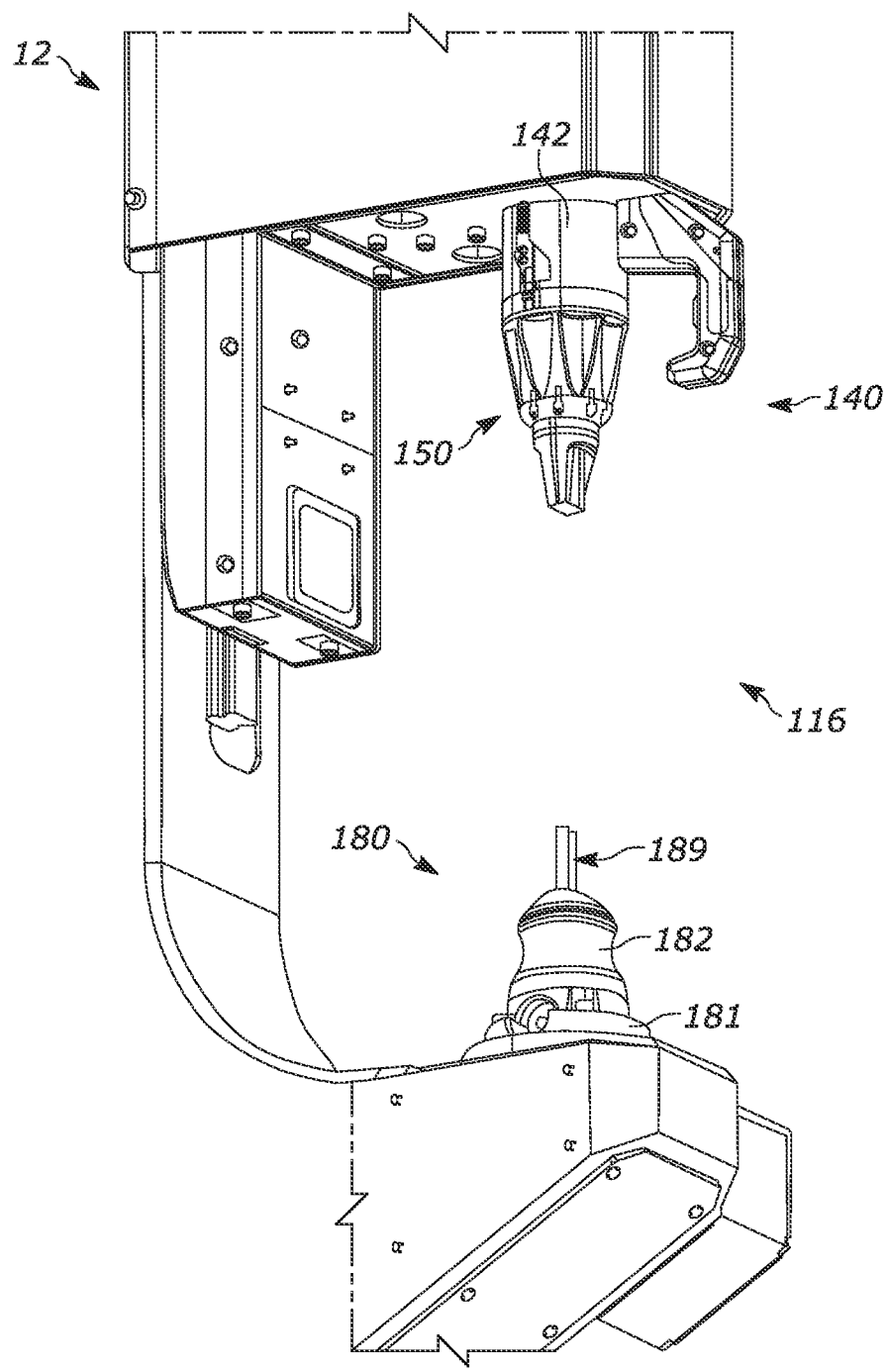
FIG. 3 illustrates another isometric view of the rivet apparatus shown in FIG. 2, in accordance with at least one configuration.

Referring now to the drawings and in particular to FIG. 1, an apparatus is disclosed, such as a rivet block 150. The rivet block 150 includes an upper portion 151 and a lower portion 155, the lower portion 155 moving up and down relative to a stationary upper portion 151. The rivet block 150 is the type of apparatus that can be used with a rivet apparatus 12 (FIG. 2). In at least one configuration, a system 200 can include a drill apparatus 11 and the rivet apparatus 12, and in at least one configuration the drill apparatus 11 being coupled to the rivet apparatus 12 via a housing 13, as shown. It will be understood that the rivet apparatus 12 is utilized to couple a fastener hardware 501 (e.g., nut plate) (FIGS. 14-18) to a bracket 502 (FIGS. 14-18), together forming a workpiece 500 (FIG. 18), via fasteners, such as rivets 161, 171, with the rivets 161, 171 securing the fastener hardware 501 to the bracket 501.

The fastener hardware 501 includes a base flange 510 having an upper surface 520 and a lower surface 522. A centrally located cylinder 514 extends from the upper surface 520 of the of the base flange 510 and includes bore 515 extending therethrough. A pair of opposing rivet openings 512 are disposed on opposing sides of the centrally located cylinder 514. The bracket 502 is coupled to fastener hardware 501 which corresponding openings 512 and bore 515 by extending rivets through the openings 512 to couple the same together. It will be understood that a number of different configurations exist for the fastener hardware and the brackets. Additionally, it will be understood that the particular assembly of the present disclosure is not limited for use in association with such brackets, hardware or rivets.

Figure 16:
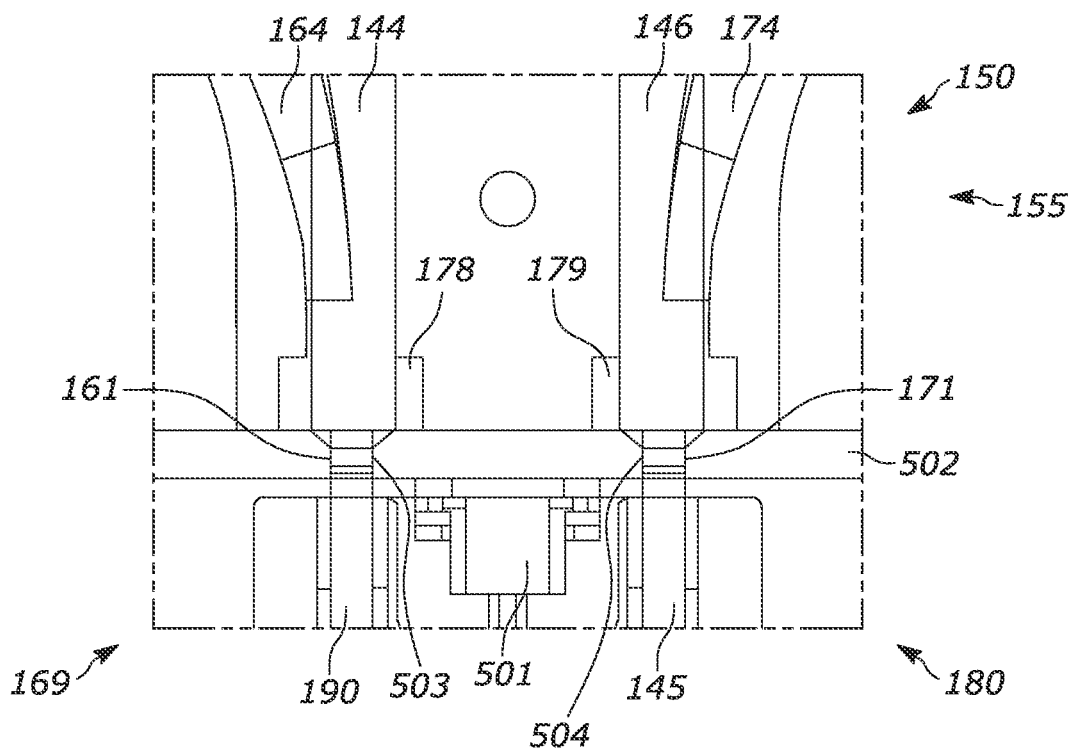
FIG. 16 illustrates rivet pins of the rivet block, shown in FIG. 1, pushing the rivets shown in FIG. 15 fully into the workpiece, in accordance with at least one configuration.
Figure 17:
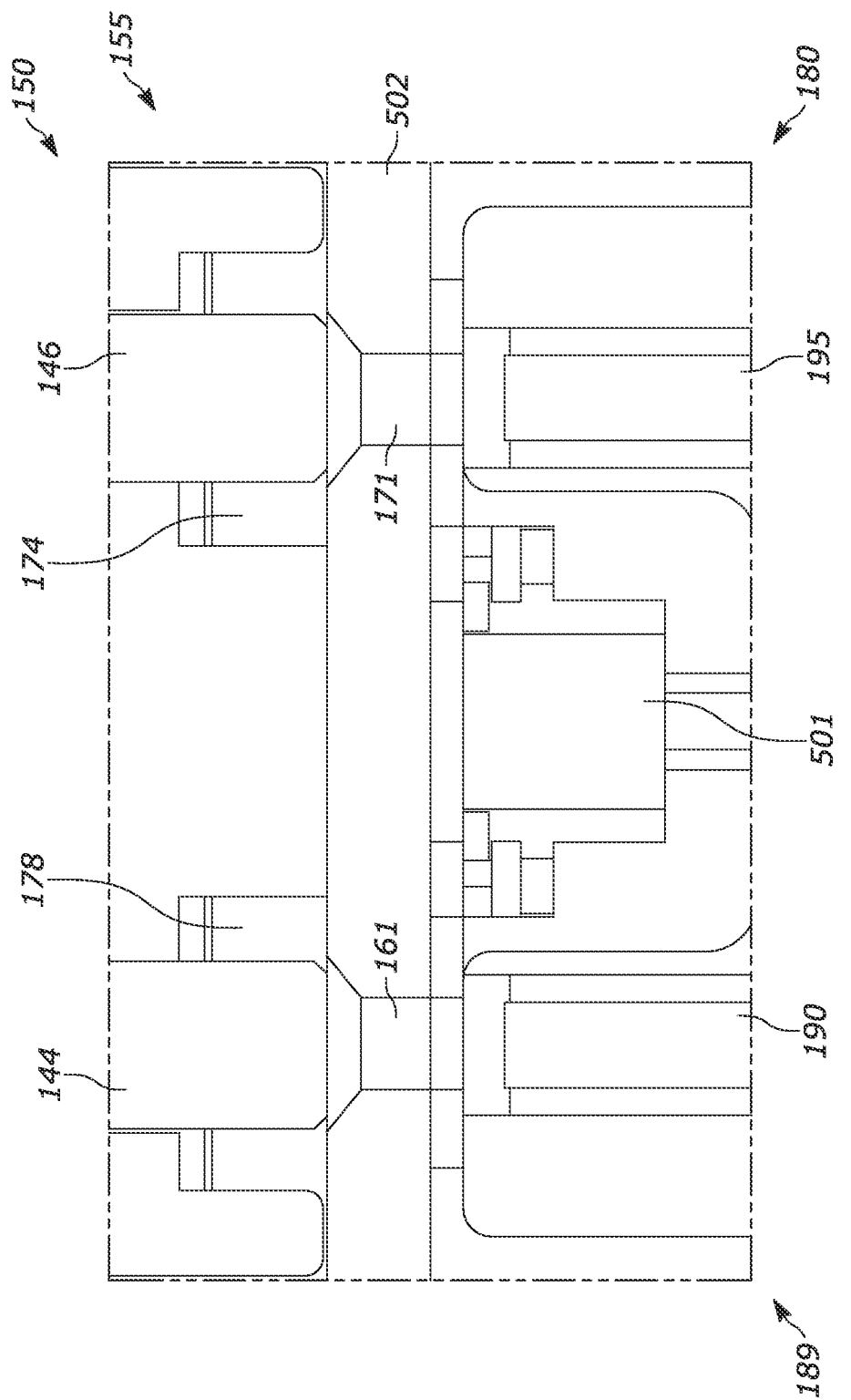
FIG. 17 illustrates the deforming pins deforming tails of the rivets shown in FIG. 16, in accordance with at least one configuration.
Figure 18:
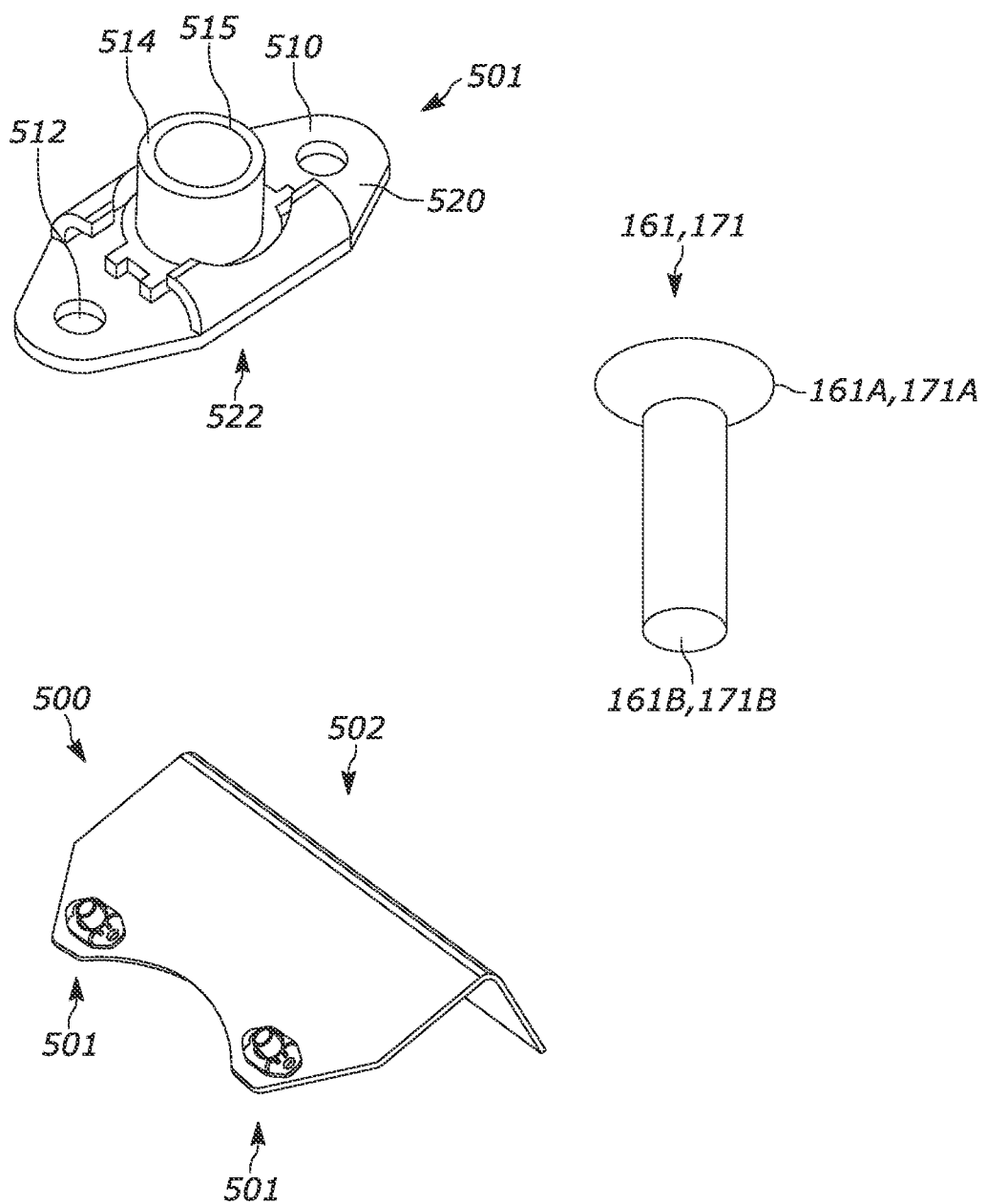
FIG. 18 illustrates an example workpiece, including an example bracket and example fastener hardware, and an example rivet, in accordance with at least one configuration.

Each of the rivets 161, 171 include a head end 161A, 171A and a tail end 161B, 171B, respectively. In the example shown, the heads 161A, 171A are countersink type heads such that the heads 161A, 171A are configured to sit flush with the bracket 502 once installed, as shown in FIGS. 16 and 17. In at least one other configuration for the rivets 161, 171, the heads 161A, 171A can be round heads, such that the heads 161A, 171A can be disposed on a surface of the bracket 502. The configuration of the fastener hardware 501, the brackets 502 and the rivets discussed herein can be varied and the disclosure is not limited to any particular configuration of any of these components.

The rivet apparatus 12 includes a riveting assembly 116 (FIGS. 3, 4, 7-10) as comprising an upper riveting portion 140 and a lower riveting portion 180. The upper riveting portion 140 further includes a coupling base 142 and the rivet block 150. The upper riveting portion 140 positions one or more rivets, such as rivets 161, 171, for riveting the workpiece 500, while the lower riveting portion 180 deforms a tail end of the one or more rivets, such as rivets 161, 171, so as to expand the tail ends to be wider than a shaft, disposed between the head ends and the tail ends of the rivets, such as rivets 161, 171, thereby riveting together two portions of the workpiece 500, details of which are discussed in more detail below. Although two portions of the workpiece 500 are disclosed herein, the fastener hardware 501 and the bracket 502, one skilled in the art would appreciate that the workpiece 500 can include more portions that the example disclosed. Typical rivet apparatus utilize a driving motion from a bottom of a workpiece. In contrast to typical rivet apparatus, in at least one configuration the rivet apparatus 12 can utilize driving motion from only a top of the workpiece 500, with the lower riveting portion 180 remaining stationary. Thus, the rivet apparatus 12 is able to rivet the workpiece 500 without a driving motion from a bottom of the workpiece 500, saving complexity and associated costs. In other configurations, the rivet apparatus 12 can also include a driving motion from a bottom of the workpiece 500, without departing from the scope of this disclosure.

In at least one configuration, the coupling base 142 is coupled to the upper portion 151 of the rivet block 150 in a releasable manner, such via quick connect couplings 143. It is contemplated that the quick connect couplings 143 may be utilized where the coupling base 142 can be detached from the upper portion 151 of the rivet block 150 without tools by an operator of the rivet apparatus 12. This simplified removal allows changeout for different versions of the quick upper riveting portion 140, such as for ones including more or less rivet pins that the example rivet apparatus 12 shown, for different size rivets, etc. In at least one other configuration, the coupling base 142 may be fixedly coupled to the upper portion 151 of the rivet block 150, or may be removable with the use of tools or the like.

One skilled in the art would appreciate that the rivet block 150 includes first and second rivet pins 144, 146 that are coupled substantially centrally to and disposed within the upper portion 151, such that the lower portion 155 slides up and down on the first and second rivet pins 144, 146 relative to the upper portion 151. The first rivet pin 144 and the second rivet pin 146 are coupled to and disposed within the upper portion 151 in a generally parallel spaced apart configuration (generally corresponding to the spacing between the rivets 161, 171), as shown. The first and second rivet pins 144, 146 are also disposed perpendicular to a first end 150A of the upper portion 151 such that rivets 161, 171 are pushed at a perpendicular angle into the fastener hardware 501 and the bracket 502 from the head end of the rivets 161, 171. The first rivet pin 144 includes a fixed end 144B, fixed to the upper portion 151, and a distal end 144A, and the second rivet pin 146 includes a fixed end 146B, fixed to the upper portion 151, and a distal end 146A. The distal ends 144A, 146A, of the first and second pins 144, 146, respectively, push against the head ends 161A, 171A of the rivets 161, 171, respectively, to push the rivets 161, 171 into the fastener hardware 501 and the bracket 502. In at least one configuration of the rivet apparatus 12, the distal ends 144A, 146A of the first and second rivet pins 144, 146 are approximately a same width as heads of the rivets 161, 171, as shown in FIGS. 16 and 17.

The rivet block 150 further includes the first end 150A and a second end 150B. In at least one configuration of the rivet apparatus 12, the lower portion 155 of the rivet block 150 is moveable upward and downward such that the first and second rivet pins 144, 146 stop flush with the second end 150B of the rivet block 150, as shown in FIGS. 16 and 17, although in other configurations the first and second rivet pins 144, 146 do not stop flush based on the configuration of a rivet and a bracket being riveted. The rivet block 150 includes pathways or bores through which the rivets 161, 171 traverse and additional pathways or bores through which the first and second pins 144, 146 traverse. In at least one configuration of the rivet apparatus 12, the rivet block 150 includes a first pin bore 152 and a second pin bore 154, each extending from the first end 150A to the second end 150B of the rivet block 150. The first pin bore 152 includes a top end 160 and a bottom end 162.

The rivet block 150 further includes a first rivet bore 164 and a second rivet bore 174, each extending from the first end 150A to the second end 150B of the rivet block 150. The first rivet feed bore 164 is coupled to and is oblique to the first pin bore 152 (e.g., approximately 20 degree angle therebetween), intersecting the first pin bore 152 between the top end 160 and the bottom end 162. Other angles are possible dependent upon a configuration of rivet locations on the workpiece 500. Typically, rivets are fed into a typical rivet block though couplings that are disposed on sides of this typical block. This typical configuration results in inconsistent rivet feeds into the typical rivet block because of motions of this typical rivet block during use. Disposing the first and second rivet feed bores 164, 174 within the rivet block 150, that is integrated within the rivet block 150 as disclosed herein, at least mitigates such problems associated with typical rivet feeds.

The spacing of the first and second rivet pins 144, 146 is dependent upon the particular fastener hardware and bracket being riveted. One skilled in the art would also appreciate that the rivet apparatus 12 is an example of such an apparatus, and that the rivet apparatus 12 can include less rivet pins (e.g., one) than the example rivet apparatus 12 or more rivet pins (e.g., three or more) than the rivet apparatus 12, dependent upon the particular fastener hardware and bracket being riveted. Thus, the example spacing between the first and second rivet pins 144, 146 shown is configured to correspond to the example fastener hardware 501 and bracket 502, shown in detail in FIGS. 14-18, the disclosure not limited to such examples.

In at least one configuration of the rivet block 150, the spacing between first pin bore 152 and the second pin bore 154 (which also changes the spacing between the first and second rivet pins 144, 146) can be either closer together than that shown, or farther apart than that shown, without changing a location of the first and second rivet feed bores 164, 174. Such changing of a distance between the first and second pin bores 152, 154, without changing a distance between the first and second rivet feed bores 164, 174, will likewise change the oblique angle therebetween. Thus, the rivet block 150 can be easily modified, with changing a distance between the first and second pin bores 152, 154, without changing a location of the first and second rivet feed bores 164, 174. This easy of modification of the rivet block 150 has particular application to the aerospace industry where different fasteners have small deviations with respect to a distance between their rivet openings, although such easy of modification can be applied to other industries.

Figure 10:
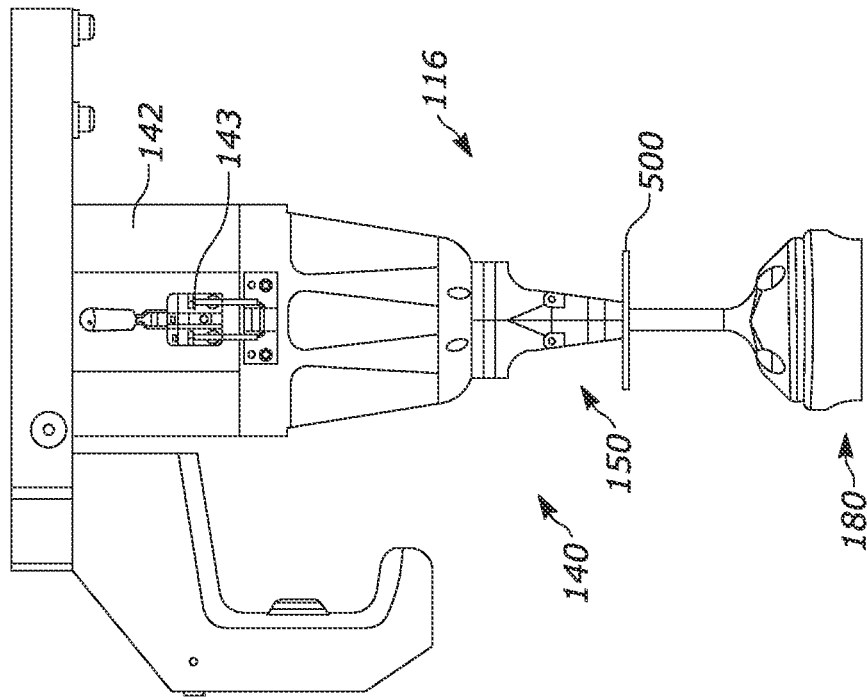
FIG. 10 illustrate another side view of the rivet block pushing against the workpiece, in accordance with at least one configuration.
Figure 9:
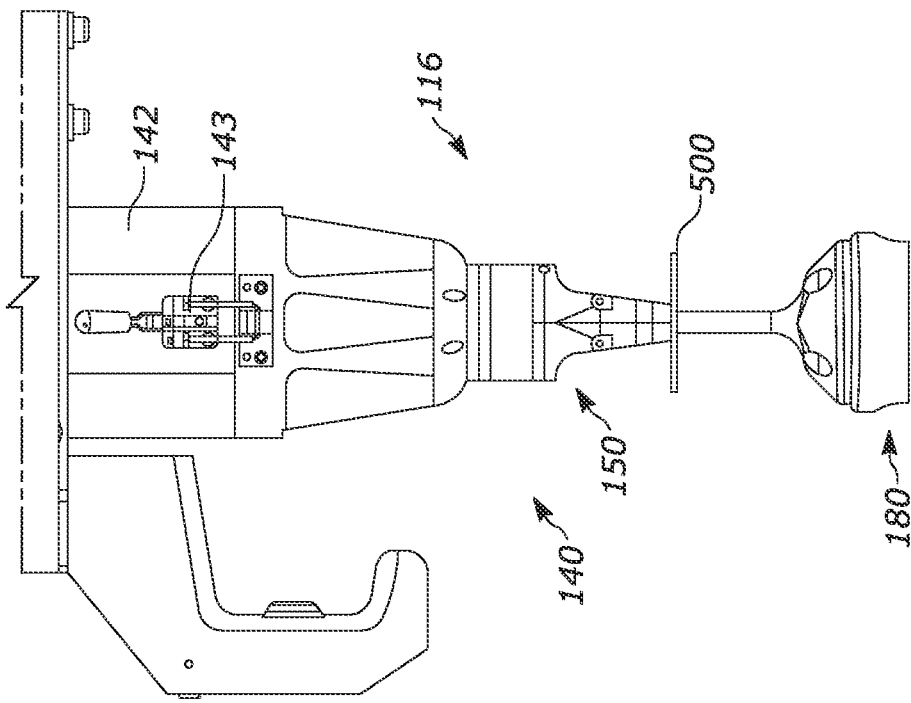
FIG. 9 illustrate a side view of the rivet block against the workpiece, in accordance with at least one configuration.

Similarly, the second pin bore 154 includes a top end 170 and a bottom end. As with the first pin bore 152, the rivet feed bore 174 is coupled to and is oblique to the second pin bore 154 (e.g., approximately 20 degree angle therebetween), intersecting the second pin bore 154 between the top end 170 and the bottom end 172. In other configurations, the second pin bore 154 can have a different angle than the first pin bore 152. It will be understood that rivets 161, 171 can be directed through the rivet feed bores 164, 174, respectively, and into position proximate the bottom ends 162, 172 of the respective first and second pin bores 152, 154. In at least one configuration of the rivet apparatus 12, a quick connect coupling (not shown) can be utilized to couple a feed line (not shown) to each of the rivet feed bores 164, 174. The lower portion 155 of the rivet block 150 can include a lower position (FIGS. 3, 4, 7, 9, 11, and 13) and an upper position (FIGS. 1, 8, 10). In at least one configuration, first ends 164A, 174A of the first and second rivet bores 164, 174, respectively, extend beyond a first end 150A of the rivet block 150 (FIG. 1). With this configuration, the first and second rivet feed bores 164, 174 slide into and out of first and second rivet feed tubes 1101, 1102 (FIGS. 11, 12) when the lower portion 155 of the rivet feed block 150 moves upward and downward, respectively. To mitigate the rivets 161, 171 hitting any hard edges while traveling from the coupling base 142 to the rivet block 150, tops of the first and second rivet feed bores 164, 174 can include tapered lead-ins. In at least one configuration of the coupling base 142, first and second mechanical seals 1103, 1104 (e.g., spring loaded seals) can be disposed within the first and second rivet feed tubes 1101, 1102 to seal the first and second rivet feed tubes 1101, 1102 to the first and second rivet feed bores 164, 174.

The first pin bore 152 and the second pin bore 154 are spaced apart from each other such that the distal end 144A of the first rivet pin 144 extends into the first pin bore 152 and the distal end 146A of the second rivet pin 146 extends into the second pin bore 154. In at least one configuration of the rivet apparatus 12, slots (not shown) can be formed in each of the first and second pins 144, 146, respectively, as shown. Additional pins (not shown) can be disposed to extend through the slots, respectively, and fixed to the upper portion 151 of the rivet block 150. When the first and second pins 144, 146 move up and down relative to the lower portion 155 of the rivet block 150 the additional pins control limits of the slidable movement of the first and second pins 144, 146 relative to the pin bores 152, 154 of the rivet block 150.

The lower rivet portion 180 is shown as including a fixed base 181, a support member 182, and a deforming mechanism 189. The support member 182 is coupled to a fixed base 181. In at least one configuration, the support member 182 is releasably coupled to the fixed base 181, such via quick connect couplings 183. In other configurations, the support member 182 can be fixedly coupled to the fixed base 181, such as via fasteners (e.g., bolts). The fixed base 181 can also be removable and replaceable to accommodate different geometries of different brackets. Likewise, the riveting assembly 116 can be removable and replaceable with changes in pitch and rivet diameter. As such, the relatively heavy fixed base 181 can be changed with less frequency (i.e., when geometry necessitates), while for many changes, only the riveting assembly 116 is changed out. In other configurations, both the riveting assembly 116 can be a single assembly that is changed out.

Figure 14:
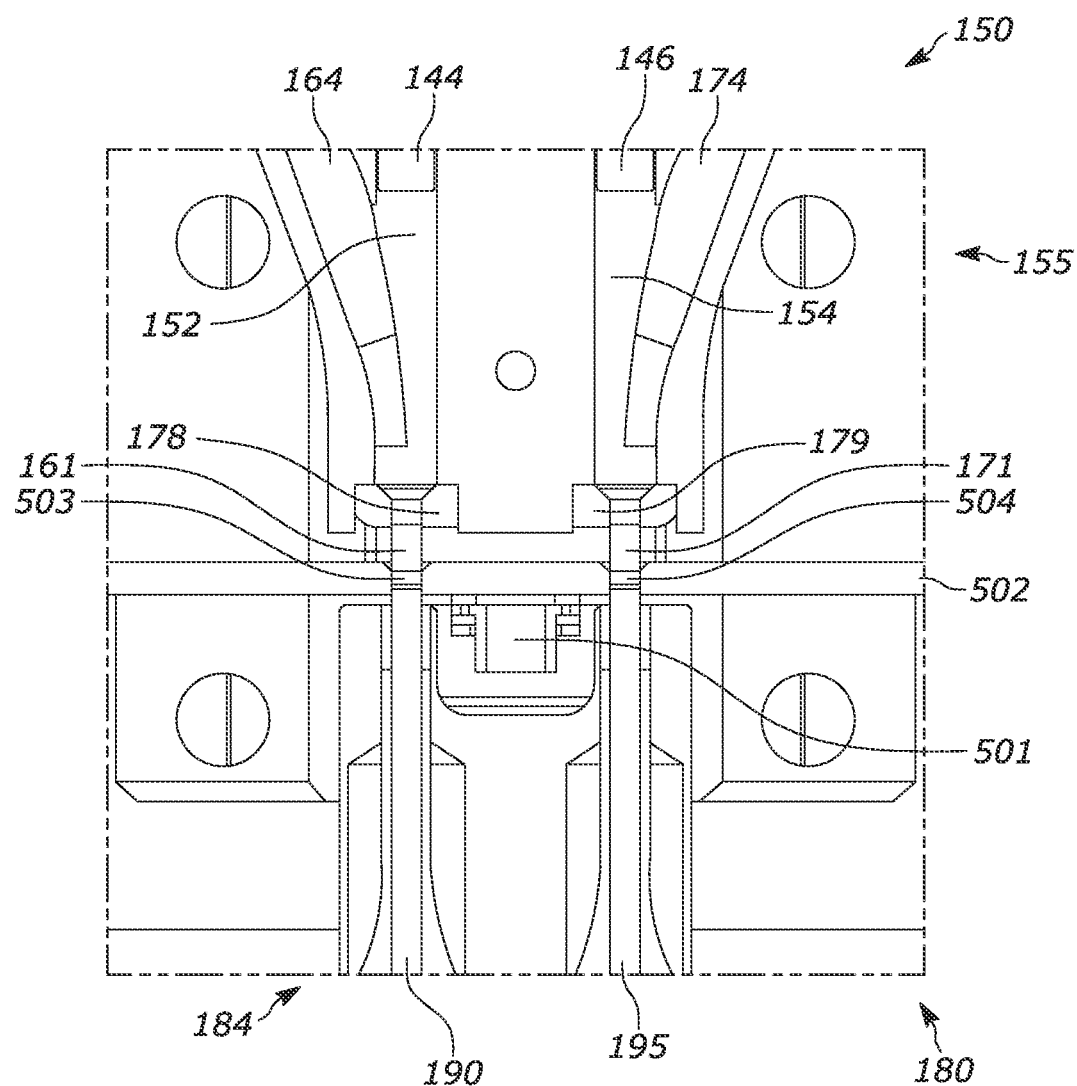
FIG. 14 illustrates rivets being inserted into the workpiece, in accordance with at least one configuration.
Figure 15:
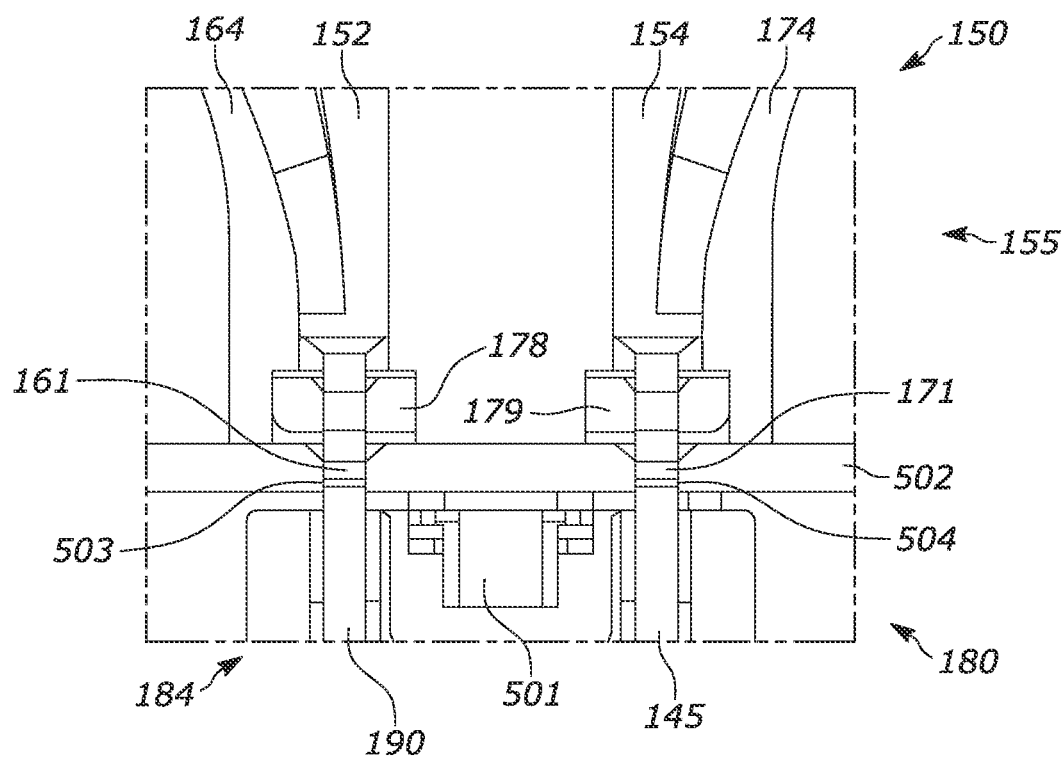
FIG. 15 illustrates the rivet block continuing toward the workpiece shown in FIG. 14, in accordance with at least one configuration.

The deforming mechanism 189 is coupled to the support member 182 and extends substantially perpendicularly upward from the support member 182. In operation of the rivet apparatus 12, once rivet openings 503, 504 have been formed (e.g., drilled via the drill apparatus 11) for the bracket 502, the bracket 502 and the fastener hardware 501 can be joined with use of the rivets 161, 171. Specifically, the fastener hardware 501 is mounted onto the lower rivet portion 180. In particular, the fastener hardware 501 is positioned so that it is centered on the deforming mechanism 189, with a bottom surface 505 of the fastener hardware 501 facing upwardly, as shown in FIGS. 14-17. A top surface 506 of the fastener hardware 501 rests on a top of the deforming mechanism 189, such that the deforming pins 190, 195 extend into holes of the fastener hardware 501 and the rivet openings 503, 504 of the bracket 502 to align such holes for riveting with the rivets 161, 171, as shown in FIGS. 14 and 15.

Figure 5:
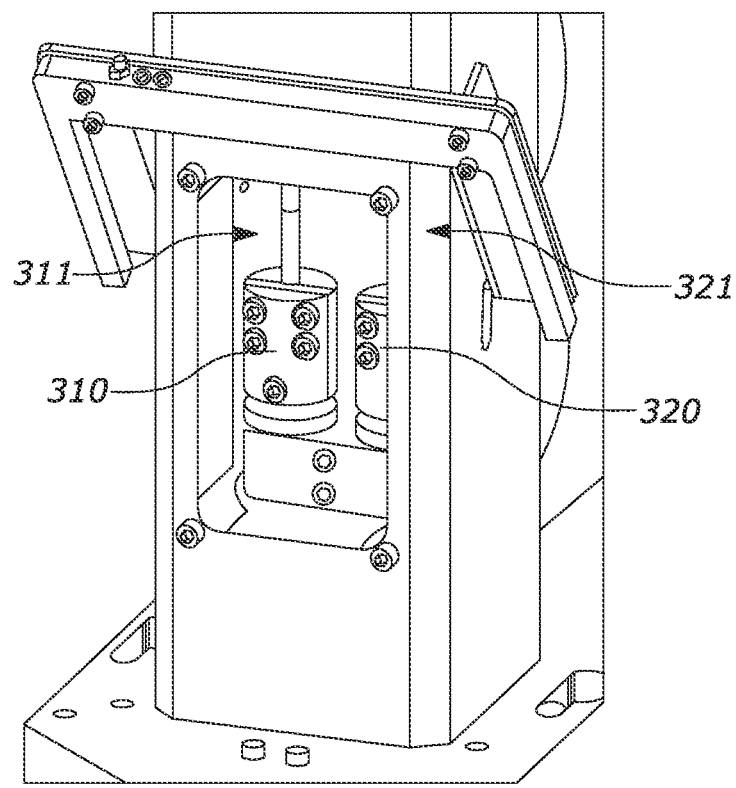
FIG. 5 illustrates blow feed compensators of the rivet apparatus shown in FIG. 2, in accordance with at least one configuration.

Next, the bracket 502 is introduced onto the bottom surface 505 of the fastener hardware 501, such that openings rivet openings 507, 508 within the bracket 502 align with the rivet openings 503, 504, respectively, of the fastener hardware 501. Once properly aligned, the rivets 161, 171 can be blown or otherwise directed through the first and second rivet feed bores 164, 174 of the rivet block 150. The rivet apparatus 12 can further include blow feed compensators 310, 320 (FIG. 5) that are actuated to blow the rivets 161, 171 through the first and second rivet feed bores 164, 174 of the rivet block 150. Sensors 311, 321 can be disposed above the blow feed compensators 310, 320, respectively, to verify a position of the blow feed compensators 310, 320 prior to blow feeding to ensure a solid connection at a break point between the blow feed compensators 310, 320 and the rivet block 150, that occurs at a base of the first and second rivet feed tubes 1101, 1102.

Figure 4:
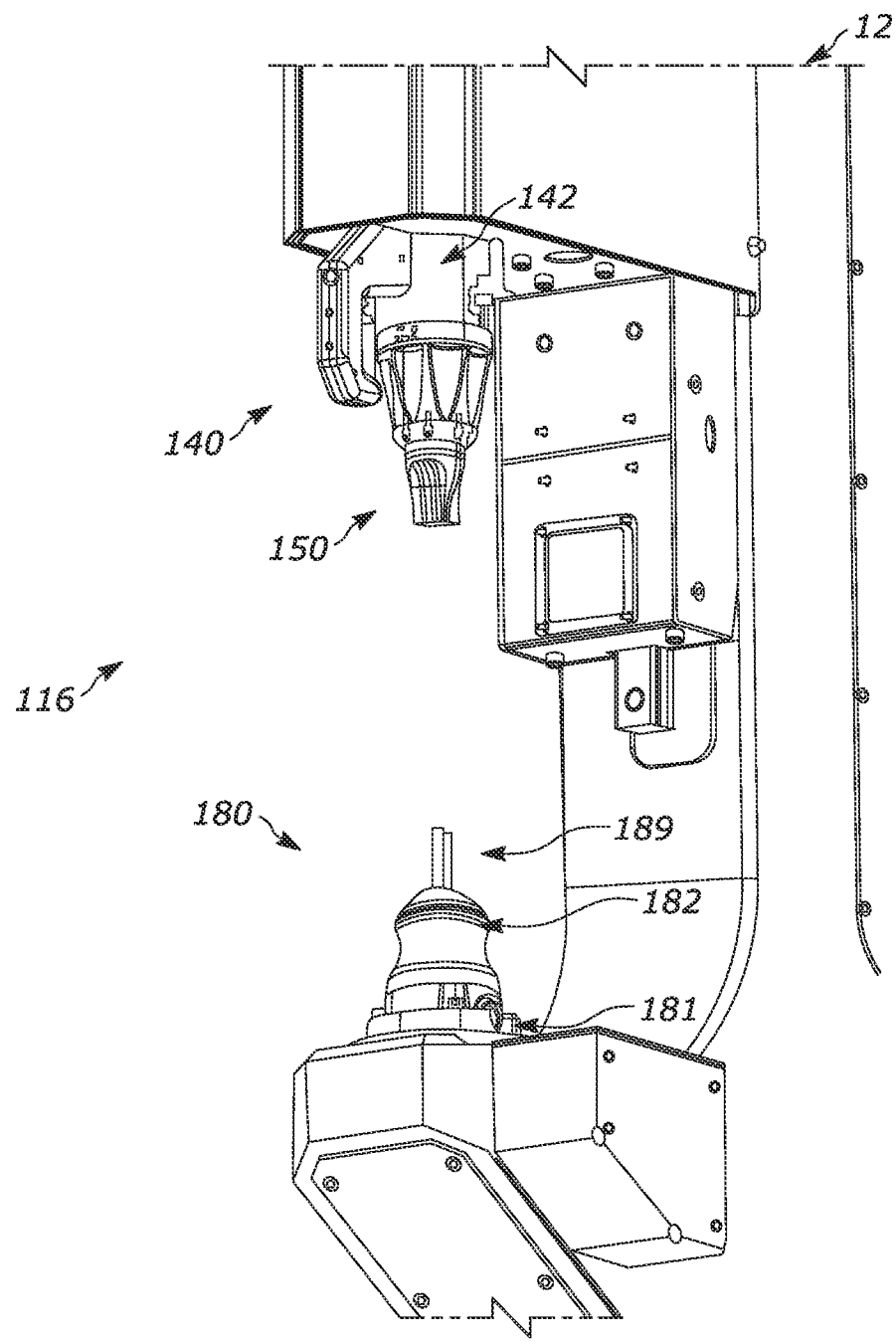
FIG. 4 illustrates yet another isometric view of the rivet apparatus shown in FIG. 2, in accordance with at least one configuration.
Figure 6:
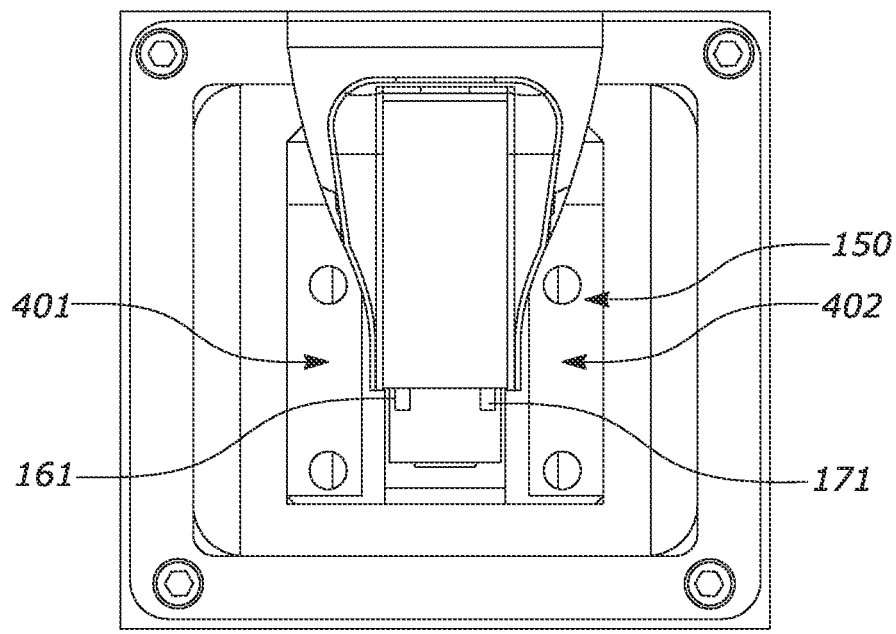
FIG. 6 illustrates rivets extending below the rivet block shown in FIG. 2, in accordance with at least one configuration.

In at least one configuration of the rivet apparatus 12, the rivet block 150 further includes first and second rivet retainers 178, 179 disposed at the bottom ends 162, 172 of the first and second pin bores 152, 154, respectively. The first and second rivet retainers 178, 179 can include movable jaws or the like positioned with the first and second rivet feed bores 164, 174 to retain the rivets 161, 171, which movable jaws or the like being biased together to so retain the rivets 161, 171. This biasing can be overcome by the movement of the first rivet pin 144 and the second rivet pin 146 against the respective rivets 161, 171. FIG. 4 illustrates the rivets 161, 171 extending through the bottom end 150B of the rivet block 150, retained by the first and second rivet retainers 178, 179, providing a visual indication to the operator of the rivet apparatus 12 that the rivet block 150 is ready to rivet the workpiece 500, and that the rivet block 150 can be moved toward the workpiece 500. As a safety precaution, rivet sensors 401, 402, which in at least one configuration can be disposed proximate to the rivets 161, 171, respectively, can be used to verify that that the rivets 161, 171 are in their proper location and ready to rivet the workpiece 500, as shown in FIG. 6. Although FIG. 6 shows the rivets 161, 171 extending below the rivet block 150, in other configurations the rivets 161, 171 can remain entirely within the rivet block 150 prior to riveting.

The rivet apparatus 12 is activated so as to move the rivet block 150 toward the lower riveting portion 180. As the rivet block 150 moves toward the lower riveting portion 180, eventually, a second end 150B of the rivet block 150 engages with the bracket 502 (FIG. 9) sandwiching the bracket 502 between the upper riveting portion 140 and the lower riveting portion 180, at which point the rivets 161, 171 get pushed upward by the deforming mechanism 189. Eventually, the rivets 161, 171 are pushed by the rivet block 150, first into the bracket 502 and then the fastener hardware 502 and into the deforming mechanism 189. That is, the first and second pins 144, 146 continue driving the rivets 161, 171 downward into the bracket 502 and the fastener hardware 501, toward the deforming mechanism 189.

In at least one configuration of the rivet block 150, the rivet block 150 includes one or more bias members 156 disposed between the upper portion 151 and the lower portion 155 to providing biasing against the rivet block 150 as it moves upward. It will be understood that in some configurations of the rivet apparatus 12, these one or more biasing members 156 can be a spring, and in other configurations the one or more biasing members can be other than a spring. For example, pneumatic cylinders, gas shocks or other biasing structures can be used instead of springs, without limitation, as are various types of springs can be used as biasing members. When the rivet block 150 is not engaged against the workpiece 500, these one or more biasing members 156 pushes the upper portion 151 of the rivet block 150 away from the lower portion 155 of the rivet block 150. Thus, the one or more biasing members 156 are disposed between the coupling base 142 and the lower portion 155 of the rivet block 150 and providing a spring force between the coupling base 142 and the lower portion 155 of the rivet block 150.

Figure 7:
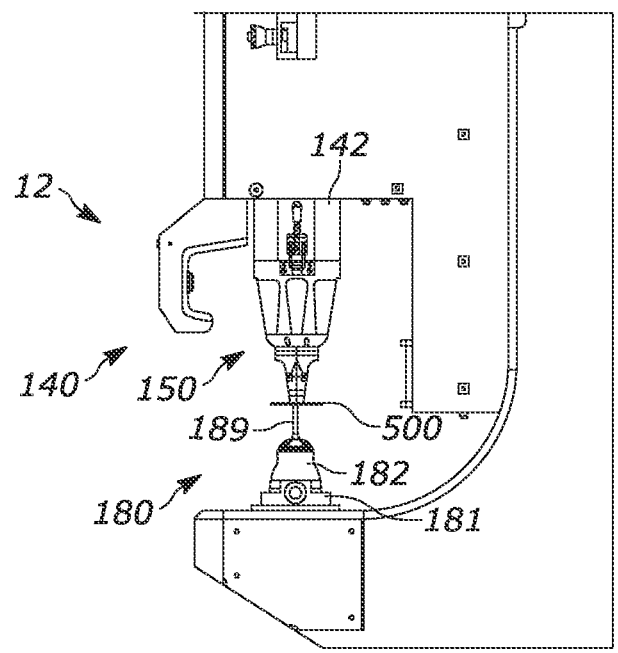
FIG. 7 illustrates a side view of a first position of the rivet block shown in FIG. 1 pushing against a workpiece, in accordance with at least one configuration.
Figure 8:
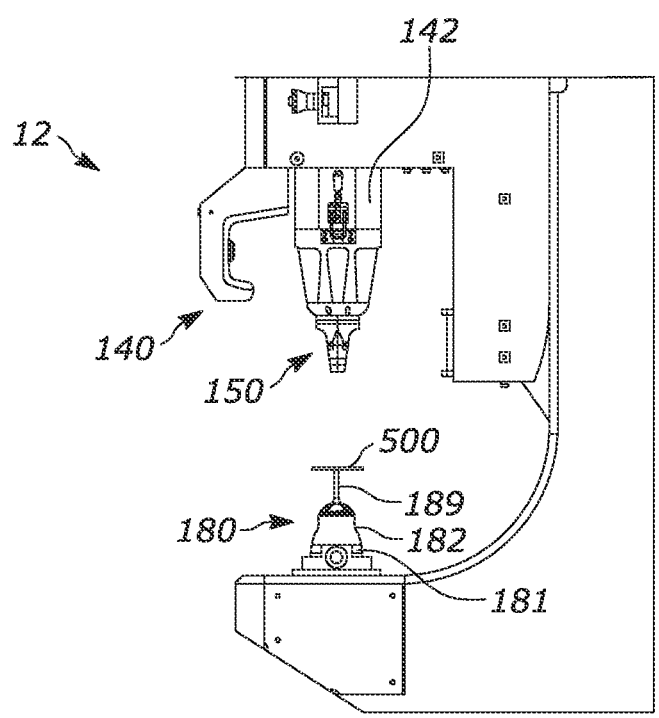
FIG. 8 illustrates a side view of a second position of the rivet block shown in FIG. 1, in accordance with at least one configuration.

The rivet block 150 reaches a point where it is pushed upward by the lower rivet portion 180, pushing upwards on the rivets 161, 171 (FIGS. 7 and 10). The rivet block 150 continues to push downward, at which point the rivets 161, 171 are fully seated into the bracket 502 (FIG. 16). In at least one configuration of the deforming mechanism 189, the deforming mechanism 189 can include deforming pins 190, 195, corresponding to the rivet pins 144, 146, to deform the tail ends 161B, 171B of the rivets 161, 171. The deforming pins 190, 195 of the deforming mechanism 189 forms a substantially flat coplanar forming surface, deforming the tail ends 161B, 171B of the rivets 161, 171 (FIG. 17), respectively, thereby sandwiching and joining together the fastener hardware 501 and the bracket 502. The first and second rivet pins 144, 146 push on the heads 161A, 171A of the rivets 161, 171 while the deforming pins 190, 195 push on the tails 161B, 171B of the rivets 161, 171. Once the workpiece 500 has been riveted, the upper riveting portion 140 can then move from its lowest position (FIGS. 7 and 10) to its home position or upmost position (FIG. 8), at which point the rivet apparatus 12 is ready to rivet another workpiece 500.

A position sensor 132 (e.g., Linear Variable Differential Transformer (LVDT)) can be disposed within the coupling base 142, or other sensor can be utilized to provide dynamic information relative to the stack-up height or thickness of the different configurations of the workpiece 500, such as a stack-up height or thickness of the fastener hardware 501 and the bracket 502. In other configurations, a number of other sensors can be utilized in place of the position sensor 132 to measure the stack-up height or thickness of the different configurations of the workpiece 500. It will be understood that an amount of force and an amount of movement of the lower portion 155 of the rivet block 150 can be controlled by a sensor, such as the position sensor 132. Once complete, the riveting assembly 116 can be retreated from the workpiece 500 so that an operator of the rivet apparatus 12 can remove the joined bracket 502 and fastener hardware 501 from the rivet apparatus 12.

It will be understood that different riveting assemblies can be provided for different fastener hardware and brackets. For example, the rivet openings may be positioned further or closer to each other in different configurations, the rivet openings may be larger or smaller, there may be more or less rivet openings than the examples shown herein, etc. Additionally, the rivets may be longer or shorter, wider or narrower, etc., as the thickness of the fastener hardware and the bracket may be longer or shorter. Thus, a user can easily change the lower rivet portion 180 and the upper rivet portion 140 to accommodate for different fastener hardware and the brackets, such as without the use of tools.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A rivet apparatus comprising a rivet block, the rivet block comprising:
   a top end and a bottom end;
   a first pin bore including a top end and a bottom end and is disposed within the rivet block, the first pin bore extending from the top end to the bottom end of the rivet block, the first pin bore guiding a first rivet pin that slides downward within the first pin bore and configured to push a head of a first rivet into a workpiece;
   a first rivet feed bore including a top end and a bottom end and is disposed within the rivet block, the first rivet feed bore extending from the top end to the bottom end of the rivet block, the first rivet feed bore configured to accept the first rivet at the top end of the first rivet feed bore and guide the first rivet to the bottom end of the first rivet feed bore, the first rivet feed bore intersecting the first pin bore between the top end and the bottom end of the first pin bore at an oblique angle;
   a second pin bored, disposed parallel to the first pin bore, including a top end and a bottom end and disposed within the rivet block, the second pin bore extending from the top end to the bottom end of the rivet block, the second pin bore accepting a second rivet pin that slides downward within the second pin bore and configured to push a head of a second rivet into the workpiece; and
   a second rivet feed bore including a top end and a bottom end and disposed within the rivet block, the second rivet teed bore extending from the top end to the bottom end of the rivet block, the second rivet feed bore configured to accept the second rivet at the top end of the second rivet feed bore and guide the second rivet to the bottom end of the second rivet feed bore, the second rivet feed bore intersecting the second pin bore between the top end and the bottom end of the second pin bore at the oblique angle.

2. The rivet apparatus according to claim 1, further comprising a coupling base, the rivet block being coupled to the coupling base via quick connect couplings to releasably couple the coupling base to rivet block.

3. The rivet apparatus according to claim 1, further comprising a position sensor to provide dynamic information relative to a stack-up thickness of the workpiece.

4. The rivet apparatus according to claim 1, further comprising:
   a coupling base; and
   a biasing member, disposed between the coupling base and the rivet block, to provide a spring force between the coupling base and the rivet block.

5. The rivet apparatus according to claim 4, wherein the biasing member is at least one of a spring, a pneumatic cylinder, and a gas shock.

6. The rivet apparatus according to claim 1, wherein the oblique angle is approximately 20 degrees.

7. The rivet apparatus according to claim 1, wherein the rivet block is moveable toward a fixed end of the first rivet pin such that the first rivet pin stops flush with the bottom end of the rivet block.

8. The rivet apparatus according to claim 1, further comprising a rivet retainer disposed at the bottom end of the first pin bore, the rivet retainer biased to retain the first rivet, the biasing being overcome by movement of the first rivet pin.

9. A system including the rivet apparatus according to claim 1, the system further comprising a drill apparatus coupled to the rivet apparatus via a housing.

10. The rivet apparatus according to claim 1, wherein a distal end of the first rivet pin is approximately a same width as a head of the first rivet.

11. The rivet apparatus according to claim 1, further comprising a lower riveting portion to deform a tail end of the first rivet so as to expand the tail end to be wider than a shaft of the first rivet.

12. The rivet apparatus according to claim 11, wherein the lower riveting portion includes a deforming pin, corresponding to the first rivet pin, to deform the tail end of the first rivet.

13. The rivet apparatus according to claim 1, wherein the first rivet feed bore extends beyond a first end of the rivet block, the first rivet feed bore sliding into and out of a rivet feed tube when the first rivet feed block moves upward and downward, respectively.

14. The rivet apparatus according to claim 1, wherein the rivet block includes an upper portion and a lower portion, with a biasing member disposed between the upper portion and the lower portion.

* * * * *